Feb. 11, 1969

W. STRAUSS 3,427,639

INJECTION MOLDING APPARATUS

Filed July 25, 1966

INVENTOR.
WILLIAM STRAUSS
BY Dallett Hooper
ATTORNEY

INVENTOR.
WILLIAM STRAUSS
BY Dalbee Hoopes
ATTORNEY

United States Patent Office 3,427,639
Patented Feb. 11, 1969

3,427,639
INJECTION MOLDING APPARATUS
William Strauss, Huntingdon Valley, Pa., assignor to Pennsalt Chemicals Corporation, Philadelphia, Pa., a corporation of Pennsylvania
Filed July 25, 1966, Ser. No. 567,661
U.S. Cl. 18—30   16 Claims
Int. Cl. B29f 1/06, 3/06

ABSTRACT OF THE DISCLOSURE

A rotating and reciprocating screw injection molding apparatus having a reversibly rotatable screw with a scraper nose especially adapted for thermosetting plastics. Rotation of screw in one direction feeds material into injection chamber, and longitudinal forward motion of screw injects plasticized material through nozzle. After injection and with screw urged in forward direction, brief reverse rotation of screw causes scraper to bore out and slightly retract material buildup adjacent nozzle thereby preventing short shots and/or plugging of nozzle.

---

This invention relates to an injection molding machine especially adapted for use with thermosetting plastics.

More specifically this invention relates to an injection molding machine of the in-line reciprocating-screw type and having special means for avoiding the buildup of thermosetting plastic in the nozzle of the extrusion cylinder.

In the past injection machines for injection molding thermosetting plastics have been generally of the transfer molding type such as disclosed in U.S. Patent 3,233,288, issued Feb. 8, 1966. In such a machine a reciprocating screw plasticizes the thermosetting plastic and delivers it through a large nozzle opening to a transfer pot having carefully controlled temperature from which in turn the plastic material is delivered to the mold for curing. Thermosetting plastic has also been processed in simple in-line injection molding machines wherein the screw delivers plastic through a narrow nozzle directly to the mold.

By accurately controlling the temperature of the injection molding equipment as, for example, by the control of the temperature of the screw and the forward end of the extrusion cylinder, and the amount of mechanical work done by the screw on the plastic, it is possible to deliver the thermosetting plastic to the mold in such a condition that its curing in the mold involves a reasonably short time, for instance on the order of ten to sixty seconds. By such careful control of temperature and the working by the screw of the thermosetting plastic, it is possible to operate the injection molding machine and produce plastic products of high quality.

One of the complications, however, involved in the use of an in-line reciprocating screw injection molding machine with thermosetting plastic is the setting up of thermosetting plastic in the nozzle end of the extrusion cylinder on the tapered wall adjacent the narrow nozzle outlet. The accumulation of thermosetting plastic in this space is due to the excess of plastic prepared for each shot. The quantity prepared for a shot must exceed the actual volumetric requirements of the mold cavities and runners by some minimum amount in order to assure a full filling of the mold every cycle. The fact that the screw has prepared an excess of material means that it cannot stroke full forward during injection and, therefore, the densely packed layer of material remaining on the tapered wall has an opportunity of achieving a further state of cure by the succeeding injection cycle. No matter how minimal the material remaining adjacent the tapered surface of the nozzle, it cannot be completely forced out during injection, even if excess injection pressure is used to cause flashing of the mold after the cavities are filled. Cycle-to-cycle additional layers of material can build up to reduce the volume left in the cylinder so that a short shot occurs. Alternatively, the nozzle may simply plug, obstructed by set up plastic. The machine must thereafter be shut down, the nozzle removed, and the set up portion of thermosetting plastic material on the tapered wall must be removed. Such shutdowns represent lost production to the processor.

With the present invention the build-up of thermosetting plastic adjacent the nozzle opening of the extrusion cylinder is avoided by the presence of a scraping edge on the front end of the extrusion screw combined with a reverse rotation of the screw under forward pressure after the injection stroke. This reverse rotation in a rotary direction opposite the normal rotary direction of the screw during the plasticizing causes the edge to "bore" out the built up material and effects the rearward movement of the material which would ordinarily set up in the cylinder adjacent the nozzle opening. Preferably the rearward movement of this thermosetting plastic before it sets up is sufficient to move it into the area of the first two or three flights of the injection screw in a "de-densified," less-compacted condition, retarding its cure. It may then be combined with other thermosetting plastic during the next plasticizing cycle and may on the next injection stroke move out through the extrusion cylinder nozzle into the mold.

An object of the present invention is to avoid the build-up of set-up thermosetting plastic at the forward end of the extrusion cylinder. By accomplishing this object the operation of the injection press may be continuous.

Other objects of the invention will be apparent from a reading of the following specification including the drawings wherein FIGURE 1 is an elevational view partly in section of a molding apparatus embodying the present invention;

Briefly, in an in-line reciprocating screw injection molding machine, especially adapted for molding of thermosetting plastic, the invention involves the reverse rotation of the screw after the injection stroke and while forward pressure is on the screw to effect the rearward movement of thermosetting material which would otherwise set up adjacent nozzle opening of the machine.

Figure 1:
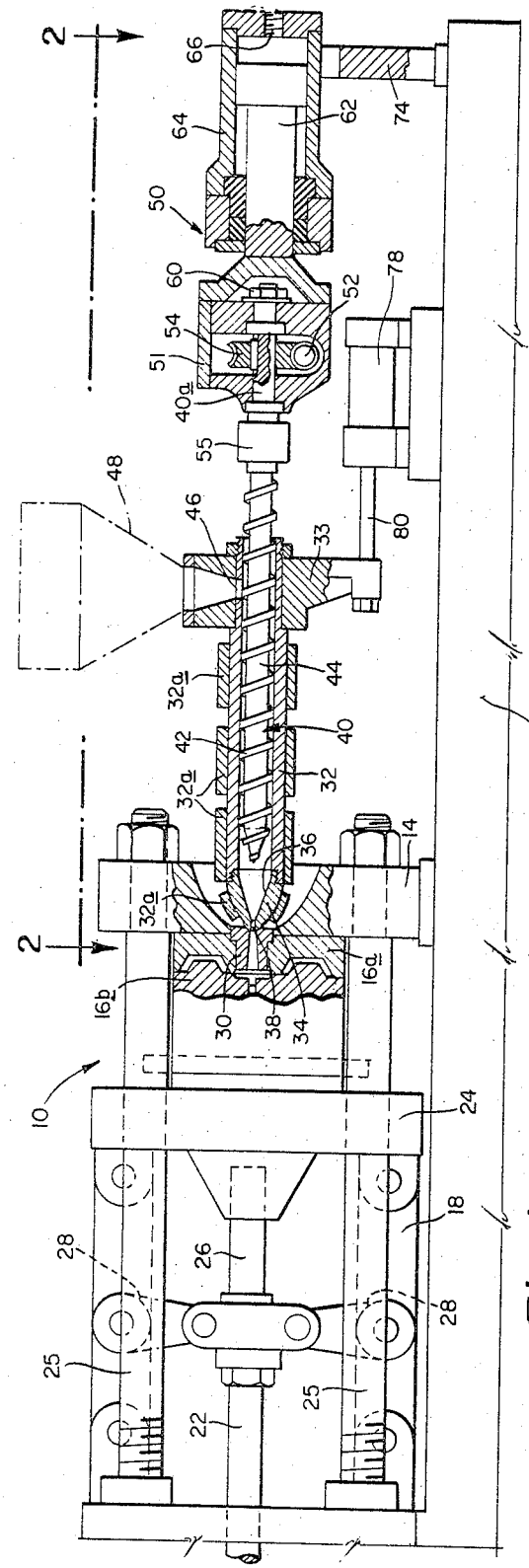

Referring more specifically to the drawings, an apparatus embodying the invention is generally designated 10 in FIGURE 1. It comprises a base 12 on which is mounted a stationary platen 14 fixedly holding one half 16a of a separable mold and a toggle-operated mold clamp 18 holding and adapted to drive the other half 16b of the separable mold. The toggle clamp 18 comprises the head plate 20 an the driving shaft 22 which is connected to a hydraulic ram (not shown). The movable platen 24 travels on tie rods 25 supported on stationary platen 14 and head plate 20 of the press. The mold half 16b is secured to platen 24 which presents an opening which slidably receives the pilot pin 26. The toggle elements designated 28 complete the assembly. Thus as is conventional when the toggle clamp drive shaft 22 retreats, the toggle elements fold inward causing the movable platen 24 and mold half 16b to retreat also. As the shaft extends the toggle element move outward to the position shown in FIGURE 1 to close the mold. The mold proper designated 16a and 16b is shown in the closed position. Access of plastic materials to the mold cavities is through the sprue bushing 30.

Alternatively the mold clamp assembly holding the mold may be disposed in a vertical direction rather than a horizontal direction as shown and the introduction of the plastic may be through a mold inlet disposed on the parting line of the mold. Irrespective of which variation is selected the injection assembly may be generally of the type to be discussed.

Figure 2:
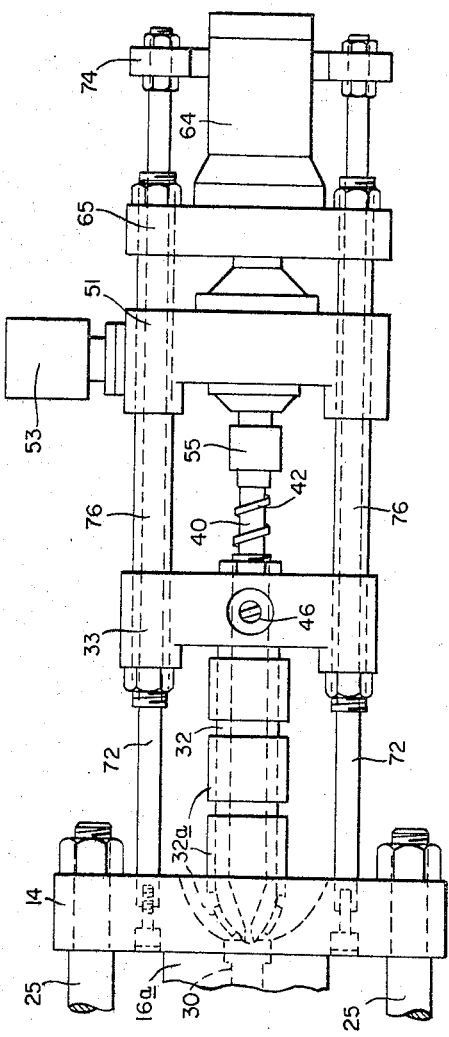
FIGURE 2 is a fragmentary top view taken on the line 2—2 of FIGURE 1.

Mounted over the base 12 to the right of the mold FIG. 1) is the extruder cylinder 32. To help control the process of the plasticizing of the plastic the cylinder 32 is provided with heating and/or cooling means 32a. The cylinder is supported on a crosshead 33 (FIG. 2). The front of the extruder cylinder 32 is equipped with a nozzle head 34, the nose of which is rounded to mate with a corresponding rounded depression in the end of the sprue bushing 30. The wall 36 on the interior of the head 34 is tapered to funnel the compressed plastic material toward the nozzle opening 38. Reciprocably and rotatably disposed within the cylinder 32 is the extrusion cylinder screw 40 which is equipped with flights 42 extending outwardly from a body 44 which may be tapered, narrowing as the rightward end (FIG. 1) of the screw is approached to provide a compression of the plastic as the plastic is worked toward the forward end of the cylinder. Cooling and/or heating means can also be provided in the screw as is known in the art.

Rotary and reciprocal motion is supplied to the screw 40 by the driving assembly 50 disposed to the right of the extrusion cylinder as shown in FIGURE 1. Rotary power is provided at rotary drive mount 51 through a worm gear 52 driven by a motor 53 (FIG. 2) and which engages a worm wheel 54 mounted on an extension 40a of the screw shaft. A suitable coupling 55 is provided between the shaft and the screw proper. A thrust bearing 60 connects the screw shaft for reciprocal movement with the piston 62 mounted in cylinder 64. The cylinder 64 is supported on crosshead 65. To the end of the cylinder 64 is connected the hydraulic inlet 66. Suitable controls may be provided in the hydraulic circuit.

Plastic is supplied in unplasticized form in the extrusion cylinder through the opening 46 from a plastic supply hopper 48.

As shown in FIGURE 2, structure to the right of the mold 16a is supported on parallel horizontal rods 72 extending between the stationary platen 14 and yoke 74. Slidable on the rods 72 are sleeves 76. To the opposite ends of the sleeves are secured the extrusion cylinder crosshead 33 (FIG. 2) and the power clinder crosshead 65, respectively, to comprise a carriage. The rotary drive mount 51 is slidable on the sleeves 76.

The extrusion cylinder itself and the screw and drive assembly 50 may thus be moved forward and away from the mold support 14 by the cylinder 78 in which operates the piston having rod 80 connected to the extrusion cylinder crosshead. This movement is especially desirable as part of each cycle in embodiments in which the mold inlet is disposed on the parting line of the mold, and, of course, it is desirable in all embodiments for startup and purging. The cylinder 78 is mounted on the base 12.

Figure 3:
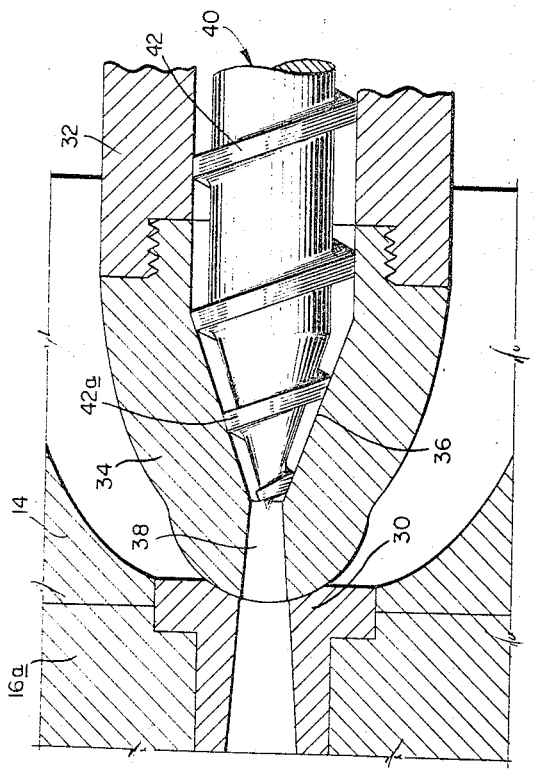
FIGURE 3 is an enlarged sectional view showing the structure of the front end of an extrusion cylinder of an apparatus embodying the invention.

Referring now to FIGURE 3 of the drawings, it will be seen that as described the head 34 of the extrusion cylinder 32 is provided with the nozzle opening 38 to which the tapered inside walls 36 of the head 34 direct the plastic. For simplicity the heating and/or cooling means are not shown in FIGURES 3 and 4. The screw 40 bears the flights 42. As shown the flights extend forward in the area designated 42a and are tapered there to correspond with the taper of the wall 36. Thus when the cylinder 32 is empty as the screw is moved to its forwardmost position, the flights in the area 42a may actually become disposed with their distal edges engaging or virtually engaging the wall 36 of the head 34. In a preferred embodiment to avoid galling of the wall 36 the screw stops just short of the wall—the spacing at this point may be .005 to 010.

Figure 4:
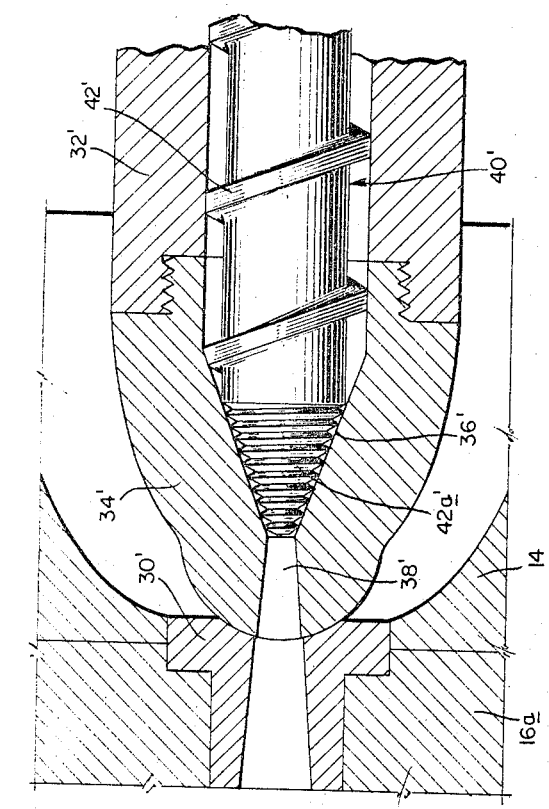
FIGURE 4 is a sectional view of a variation of screw structure of an apparatus also embodying the invention.

In the modification of an apparatus embodying the invention shown in FIGURE 4, the primed version of the same reference numerals used in FIGURES 1 through 3 designate corresponding parts. It should be noted that the distinction is that the flights in the area 42a' are of considerably lesser pitch than the flights in the same area of the FIGURE 3 embodiment and for that matter of the flights 42' in the major portion of the rest of the screw 40' in the FIGURE 4 embodiment. At the same time it should be understood that the distal edges of the flights 42a' engage or almost engage the tapered wall 36' of the FIGURE 4 when the screw is driven all the way home in the empty cylinder.

Figure 5:
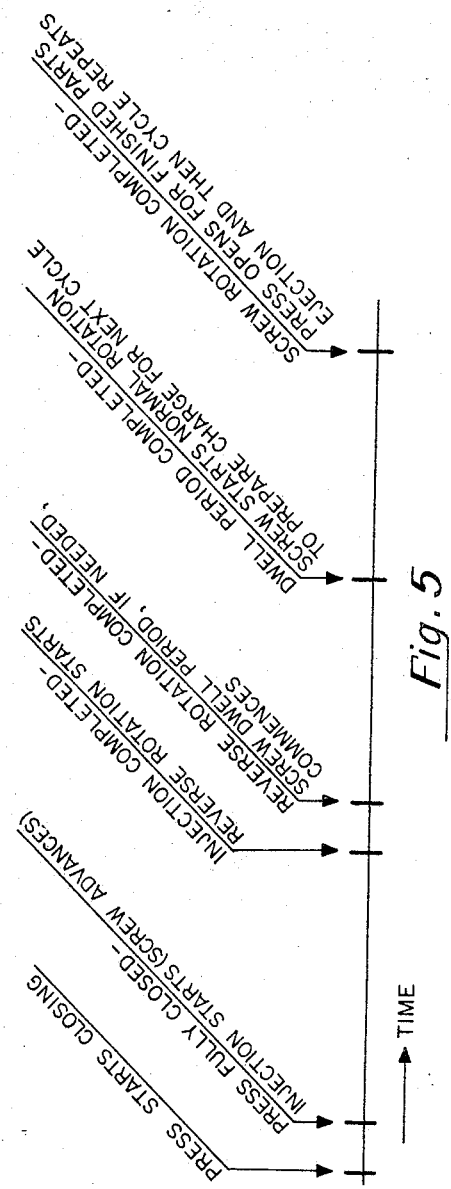
FIGURE 5 is a graph showing a typical cycle of an apparatus embodying the invention when used with thermosetting plastic material.

The operation of the apparatus as shown in the drawings may be understood easily by referring to FIGURE 5. At the beginning of a cycle the mold 16a, 16b is closed by the toggle clamp as described, and the cylinder 32, its nose against sprue bushing 30, is filled with plasticized plastic. Hydraulic fluid is then forced into the cylinder 64 to drive the piston 62 and the screw 40 forward forcing plastic through the bushing into the mold. Because slightly more plastic has been plastized than is needed to fill the mold, there is at the end of the injection stroke a slight amount of plastic between the flight 42a and the wall 36. In other words, the screw cannot assume the full forward position of the drawings. The screw is then rotated in a reverse direction for a period while forward pressure is still being applied by hydraulic fluid against the piston 62. This rotation of the screw reams the accumulated plastic on the wall 36 rearwardly to decompact it and to clean off the surface 36 down to the wall or to a thin film. The thus decompacted plastic is moved back on the screw and suitable for injection with fresh plastic into the mold on the next injection stroke.

After a dwell period, if needed, during which curing commences in the mold or immediately after reverse rotation, the screw 40, still forward, is rotated in the forward direction. This causes the plastic entering the cylinder 32 through the opening 46 to be conveyed forwardly in the cylinder and to accumulate in the nozzle area. As the plastic is conveyed forward, it is worked by the flights of the screw and is plasticized. The heating and/or cooling means 32a aids in the plasticizing of the plastic by adding heat, or at the same time, by cooling when and as necessary to avoid the setting of the plastic in the extrusion cylinder.

As the plastic accumulates in the forward end of the extrusion cylinder the continuing rotation of the screw 40 drives the screw rearwardly against the opposition of flow of hydraulic fluid from the hydraulic cylinder 64. This opposition which may be adjustable, as by an adjustable restriction in the outlet line 66, imparts additional plasticizing effect increasing pressure on the plastic and thereby increasing heat of friction. When the screw 40 is driven to its rearward position by the pressure of plastic in front of it, the plastic is ready for the next injection stroke. Before the next cycle, however, and after the plastic has set in the mold, the mold is opened, the part is ejected, and the mold closed.

If the gate is disposed on the parting line of the mold, the cylinder 78 may be activated to advance the carriage after the mold is closed and to withdraw it before the mold is opened. This avoids lateral pressures by the nose of the extrusion cylinder on the mold halves, except, of course, when the mold is closed. Other variations of the invention can involve the use of a straight ram rather than a toggle mold clamp, rotation of the screw in the forward direction through the injection stroke.

An essential of the present invention is the reverse rotation of the screw while forward pressure is maintained on it after the injection period. With apparatus embodying the invention and operated in accordance therewith continuous molding of thermosetting plastics is possible. For instance, the continuous molding of phenolic compounds, urea, melamine, diallyl phthalate and rubber thermosets is now possible in an in-line reciprocating screw machine. Heretofore these thermosets would build up in set layers adjacent the nozzle opening of the extrusion cylinder and cause pluggage or short shots after a very limited number of cycles depending on the nature of the thermosets used.

The benefits of the invention were recognized during an operation on a Stokes horizontal injection molding press similar to the one shown in the figures of the drawings and cycling the machine both without and with reverse rotation. Using Durez 791-flow 12, a typical general purpose phenolic, the machine was cycled for a total cycle time of 51½ seconds. Temperatures along the extrusion cylinder measured from 190 to 260° F., and the plastic emerged from the nozzle at a temperature of about 250° F. An injection pressure of approximately 13,000 pounds per square inch was developed by the machine with no provision for the reverse rotation as described in the present invention. The operation of the machine was commenced on an automatic basis. It was quickly noticed that on each successive cycle the forwardmost position of the screw at the end of the injection stroke became spaced a greater and greater distance from the head of the extrusion cylinder. It was expected that this was because of the buildup of thermosetting plastic adjacent the extrusion nozzle. Eventually the capacity of the extrusion cylinder barrel was so limited by the buildup of thermosetting plastic that there was not sufficient plastic prepared to fill the mold cavity and a short shot occurred. The machine was stopped and the front end of the extrusion cylinder was opened to expose a setup plug of thermoset. This built up thermoset material was reamed out and the machine was reassembled.

The same machine was then reprogrammed on the same plastic material at the same operating conditions. The new program included immediately after the injection stroke reverse rotation of the injection screw while forward pressure was still on the screw. Operation was commenced on an automatic basis. On each cycle the screw pressed home to the same forward position. The machine was run continuously for a long period of time with no indication of buildup in the forward part of the extrusion cylinder. The two described periods of operation of the machine without and with operation in accordance with the invention demonstrate conclusively the importance of the invention and the new practicality of continuous operation of the machine without pluggage or short shot. Further experimentation with reverse rotation and varying temperatures of the extrusion cylinder at various points and still using reverse rotation in accordance with the invention demonstrated that the continuous operation of the machine showed little criticality in the successful handling of the plastic. Fairly high temperatures of plastic delivery to the mold could be employed for quick sets within the mold without the pluggage or buildup in the extrusion cylinder by set-up thermoplastic. In operation without reverse rotation the extent of build-up per shot had been extremely sensitive to temperature changes.

It should be understood that the reverse rotation may be effected either immediately after injection (at the start of the dwell period) or at the start of the screwing period (after the end of the dwell period), or, for that matter at any time in between these two times. It is essential, however, that the screw be under forward pressure at the time of the reverse rotation. This forward pressure can be as high as the injection pressure but normally a lesser pressure will suffice.

Variations in the configurations of the front end of the screw are within the scope of the invention. In both FIGURES 3 and 4 screw threads in the area 42a of the same hand as the flights 42 have been disclosed. Actually these flights 42a may be substituted by threads of opposite hand from the flights 42. Vanes or splines more or less parallel to the axis of the screw or a series of buttons extending out from the screw head body may be used. It may be generalized that any kind of a scraping edge sufficient to bore out the thermosetting plastic in the area of wall 36 during reverse rotation and while the screw is still under forward pressure will suffice. The flights 52a of the same hand and pitch as the flights 42 are preferred.

It should also be noted that the invention contemplates as described not only the engagement of the wall 36 by the scraping edge of the head of the screw but also the spacing of the edge a suitable distance from the wall 36 provided the screw is advanced during the reverse rotation period to this point on a regular basis. This advance will bore out the thrmosetting plastic to avoid the occurrence of a short shot or the plugging of the nozzle outlet. The approach of the screw toward the surface 36 can be governed by a limit switch controlling the flow of hydraulic liquid into the cylinder 64 as will be understood by those skilled in the art.

Limit switches or timing means can be employed to control the commencement of the reverse rotation at a given position during the forward movement of the screw. It is also possible to employ combinations of timing means and limit switches to activate an alarm or shut down the machine when the screw does not, for instance, after a set period of time reach the position for commencement of reverse rotation period or indeed the ultimate forward limit after reverse rotation.

The present invention may thus be embodied in other specific forms without departing from the spirit or central attributes thereof and, accordingly, reference should be made to the appended claims rather than the foregoing specification as indicating the scope of the invention.

I claim:

1. In an injection molding machine especially adapted for molding of thermosetting plastic, an extrusion cylinder having a distal end operatively connected with a mold, a screw reciprocally and rotatably mounted in said extrusion cylinder, means for axially driving the screw toward the distal end, means to introduce plastic material into the extrusion cylinder, the distal end of the extrusion cylinder having a tapered inside wall narrowing as the mold is approached and the corresponding end of the screw having a scraping edge with a complementary taper, means to rotate the screw in one direction to deliver plastic to the distal end of the extrusion cylinder, and means to rotate the screw in the reverse direction after the injection stroke while said driving means is forcing the screw toward said distal end to bore out and cause rearward movement of plastic material between the tapered end of the screw and the tapered wall.

2. An injection molding machine as described in claim 1 wherein the scraping edge comprises a screw flight of the same hand and approximately the same pitch as the flight on the screw remote from the end.

3. An injection molding machine as described in claim 1 also including means to stop the forward motion of the screw at a predetermined position adjacent the distal end of the tapered wall.

4. An injection molding machine as described in claim 1 also including means to actuate a signal if the screw does not reach a predetermined point adjacent the tapered end of the cylinder after a preset period.

5. An injection molding machine especially adapted for molding of thermosetting plastic material, comprising a mold, an extrusion cylinder having a nozzle operatively connected to said mold, an injection screw in said extrusion cylinder, said cylinder having a tapered interior end adjacent the nozzle, the screw having a threaded and correspondingly tapered end, means reciprocate the screw axially in said cylinder means to rotate the screw in one direction during the plasticizing operation, and means to rotate the screw in the reverse direction after the injection stroke while said means to reciprocate is urging the screw forwardly, whereby after the injection stroke a portion of the thermosetting plastic material disposed in the space between the tapered end of the screw and the tapered end of the cylinder is moved by the screw rearwardly in the extrusion cylinder to avoid its setting up in said space.

6. An injection molding machine as described in claim 5 wherein means are provided to stop said means to reciprocate when the screw reaches a predetermined forward position.

7. An injection molding machine as described in claim 5 wherein means are provided to actuate a signal if the screw does not reach a point adjacent the tapered end of the cylinder after a preset period.

8. In an injection molding machine especially adapted for thermosetting plastic materials, including an extrusion cylinder with a material supply in communication therewith and a nozzle at the distal end thereof;

a screw rotatably and reciprocably supported in said cylinder, means for rotating said screw in a predetermined direction to deliver material from the supply to the distal end of said cylinder, scraper means on the distal end of said screw complementary with the interior of the corresponding distal end of said cylinder, means to drive said screw axially toward the nozzle until the distal end of said screw is in juxtaposition with the corresponding interior portion of said cylinder thereby injecting a shot of material through the nozzle, and means for rotating said screw in the reverse direction for a predetermined period while said scraper means is urged toward said nozzle and in juxtaposition with said complementary interior of said cylinder, whereby plastic material will be bored out and prevent buildup therein.

9. The injection molding machine of claim 8 wherein said scraper means constitutes screw threads.

10. The injection molding machine of claim 9 wherein the distal end of said cylinder is tapered.

11. The injection molding machine of claim 10 wherein said screw threads are of the same hand as the flights on the remainder of said screw.

12. The injection molding machine of claim 11 wherein said screw threads decrease in pitch toward the distal end.

13. The injection molding apparatus of claim 11 wherein said screw threads are of a lesser pitch than the screw flights.

14. The injection molding machine of claim 8 including means to limit said means to drive so as to prevent said scraper means from extending beyond a predetermined spaced position in the distal interior of said cylinder.

15. The injection molding machine of claim 8 including means for actuating a signal should the screw fail to reach a predetermined position within said distal end of said cylinder in a predetermined period of time.

16. The injection molding machine of claim 15 wherein said means for actuating a signal disconnects said means to drive and said means to rotate.

References Cited

UNITED STATES PATENTS

| 3,001,233 | 9/1961 | Ernst | 18—12 X |
| 3,140,332 | 7/1964 | Brown | 264—329 |

FOREIGN PATENTS

| 953,217 | 3/1964 | Great Britain. |

WILBUR L. McBAY, *Primary Examiner.*

U.S. Cl. X.R.

18—12; 264—329